US012435861B2

(12) United States Patent
Bao et al.

(10) Patent No.: US 12,435,861 B2
(45) Date of Patent: *Oct. 7, 2025

(54) LINEAR LUMINAIRE ASSEMBLY WITH DETATCHABLE LENS ASSEMBLY

(71) Applicant: CURRENT LIGHTING SOLUTIONS, LLC, Beachwood, OH (US)

(72) Inventors: Zhifeng Bao, ShaanXi (CN); Honglei Gao, ShangHai (CN); Suping Wang, ShangHai (CN); Yongli Feng, ShaanXi (CN); Mark Kaminski, Beachwood, OH (US)

(73) Assignee: CURRENT LIGHTING SOLUTIONS, LLC, Beachwood, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/897,435

(22) Filed: Sep. 26, 2024

(65) Prior Publication Data

US 2025/0012424 A1 Jan. 9, 2025

Related U.S. Application Data

(63) Continuation of application No. 18/039,635, filed as application No. PCT/US2021/072631 on Nov. 30, 2021, now Pat. No. 12,117,160.

(Continued)

(51) Int. Cl.

*F21V 5/04* (2006.01)
*F21S 4/28* (2016.01)

(Continued)

(52) U.S. Cl.

CPC .................................... *F21V 5/04* (2013.01); *F21S 4/28* (2016.01); *F21V 17/002* (2013.01);

(Continued)

(58) Field of Classification Search

CPC ........ F21S 4/28; F21V 17/002; F21V 17/164; F21V 5/04; F21V 29/10; F21Y 2103/10; F21Y 2115/10; F21K 9/275; F21K 9/278

See application file for complete search history.

(56) References Cited

U.S. PATENT DOCUMENTS

| | | | |
|---|---|---|---|
| 7,267,461 | B2 | 9/2007 | Kan et al. |
| 2003/0156425 | A1 | 8/2003 | Turnbull et al. |

(Continued)

FOREIGN PATENT DOCUMENTS

| | | |
|---|---|---|
| CN | 201401647 | 2/2010 |
| DE | 20201210596 U1 | 12/2012 |

(Continued)

OTHER PUBLICATIONS

892 Form dated Jan. 9, 2024 which was received in connection with U.S. Appl. No. 18/039,635.

(Continued)

*Primary Examiner* — Erin Kryukova

(74) *Attorney, Agent, or Firm* — Buckley, Maschoff & Talwalkar LLC

(57) ABSTRACT

Embodiments are directed to a substantially linear luminaire assembly which includes an elongated translucent or transparent housing, where the housing comprises a first end and a second end. One or more light sources may be at least partially enclosed by the elongated housing. A detachable lens assembly may be affixed at or near at least one of the first end and the second end. The detachable lens assembly may include one or more lenses improve a uniformity of light ray distribution of light rays emitted by the one or more light sources.

20 Claims, 13 Drawing Sheets

Related U.S. Application Data

(60) Provisional application No. 63/119,940, filed on Dec. 1, 2020.

(51) Int. Cl.

| | |
|---|---|
| ***F21V 17/00*** | (2006.01) |
| ***F21V 17/16*** | (2006.01) |
| ***F21Y 103/10*** | (2016.01) |
| ***F21Y 115/10*** | (2016.01) |

(52) U.S. Cl.

CPC ......... *F21V 17/164* (2013.01); *F21Y 2103/10* (2016.08); *F21Y 2115/10* (2016.08)

(56) References Cited

U.S. PATENT DOCUMENTS

| | | | | |
|---|---|---|---|---|
| 2006/0146540 | A1* | 7/2006 | Reo | F21V 31/005 362/244 |
| 2011/0280020 | A1* | 11/2011 | Chen | F21K 9/60 362/294 |
| 2012/0320587 | A1 | 12/2012 | Roberts et al. | |
| 2013/0044475 | A1 | 2/2013 | Hutchens | |
| 2014/0063793 | A1* | 3/2014 | Hasan | F21S 4/28 362/184 |
| 2014/0268727 | A1* | 9/2014 | Amrine, Jr. | F21K 9/27 362/224 |
| 2017/0122507 | A1 | 5/2017 | Hoffman | |
| 2019/0264882 | A1 | 8/2019 | Gomez Martinez et al. | |
| 2019/0338897 | A1* | 11/2019 | Brown | F21K 9/272 |

FOREIGN PATENT DOCUMENTS

| | | | | |
|---|---|---|---|---|
| DE | 102012203886 | A1 | 9/2013 | |
| DE | 102015103536 | A1 | 9/2016 | |
| EP | 2613079 | | 7/2013 | |
| EP | 2613079 | A1 * | 7/2013 | F21K 9/17 |
| EP | 2924333 | A1 | 9/2015 | |
| KR | 20200118762 | A | 10/2020 | |
| WO | WO-2021099026 | A1 * | 5/2021 | F21K 9/27 |

OTHER PUBLICATIONS

Notice of Allowance dated Jun. 12, 2024 which was received in connection with U.S. Appl. No. 18/039,639.

892 Form dated Jun. 12, 2024 which was received in connection with U.S. Appl. No. 18/039,635.

International Search Report and Written Opinion dated Mar. 30, 2022 which was issued in connection with International Patent Application No. PCT/US2021/072631.

Information Disclosure Statement dated May 31, 2023 which was file in connection with U.S. Appl. No. 18/039,639.

* cited by examiner

| | |
|---|---|
| avg | 274 |
| min | 188 |
| max | 326 |
| min/avg | 0.69 |
| min/max | 0.58 |

| | |
|---|---|
| avg | 291.22 |
| min | 253 |
| max | 330 |
| min/avg | 0.87 |
| min/max | 0.76 |

900

Total Collected Power = 89.801 lm
Efficiency = 0.93426
Maximum Intensity = 36.709 cd

LINEAR LUMINAIRE ASSEMBLY WITH DETATCHABLE LENS ASSEMBLY

CROSS-REFERENCE TO RELATED APPLICATIONS

The present application is a National Stage application under 35 USC § 371 of International Patent Application No. PCT/US2021/072631 entitled "LINEAR LUMINAIRE ASSEMBLY WITH DETACHABLE LENS ASSEMBLY" which was filed on Nov. 30, 2021, and claims the benefit of U.S. Provisional Patent Application No. 63/119,940 entitled "LINEAR LIGHT BAR WITH CLIP LENS" and filed on Dec. 1, 2020. The entire content of that application is incorporated herein by reference.

BACKGROUND

In many areas of the lighting industry, elongated luminaires, such as light bars or light battens, are employed. One type of light bar is an light emitting diode ("LED") light bar which includes a set of LEDs housed within a single package. An LED light bar uses electroluminescence emitted from a semiconductor diode that projects light outward with radiant power.

In many traditional LED light bars, there is usually one LED circuit board inside a tube or batten. However, light bars, such as LED light bars, often provide an unsatisfactory light output at the end areas, such as at each end of the tube. As a result, traditional LED light bars generally provide relatively poor uniformity of light distribution.

LEDs in an LED light bar may generate an amount of heat sufficient to cause thermal expansion of components, such as an LED circuit board. In some types of LED light bars, an LED circuit board may intentionally not be fixed into one place or spot inside of a housing or tube in order to account for the possibility of thermal expansion of components within the housing. Such thermal expansion may, in some instances, cause LEDs to slide away from their original positions within the housing, even by more than 1 mm. If the LEDs do slide from their original positions, light produced by LEDs of the LED light bar may not be uniform. For example, there may be less light emitted on one side of translucent or transparent housing of the LED light bar than is produced on the opposing side of the translucent or transparent housing.

SUMMARY

According to an aspect of an example embodiment, a substantially linear luminaire assembly may be provided which includes an elongated translucent or transparent housing, where the housing comprises a first end and a second end. One or more light sources may be at least partially enclosed by the elongated housing. A detachable lens assembly may be affixed at or near at least one of the first end and the second end. The detachable lens assembly may include one or more lenses to improve a uniformity of light ray or beam distribution of light rays emitted by the one or more light sources.

According to an aspect of another example embodiment, a substantially linear luminaire assembly may be provided which includes an elongated translucent or transparent housing, where the housing comprises a first end and a second end. A first circuit board and a second circuit board may be disposed within the housing. The first circuit board may be affixed at or near the first end of the housing. The second circuit board may be affixed to the second end. One or more first light sources may be disposed on the first circuit board. One or more second light sources may be disposed on the second circuit board.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
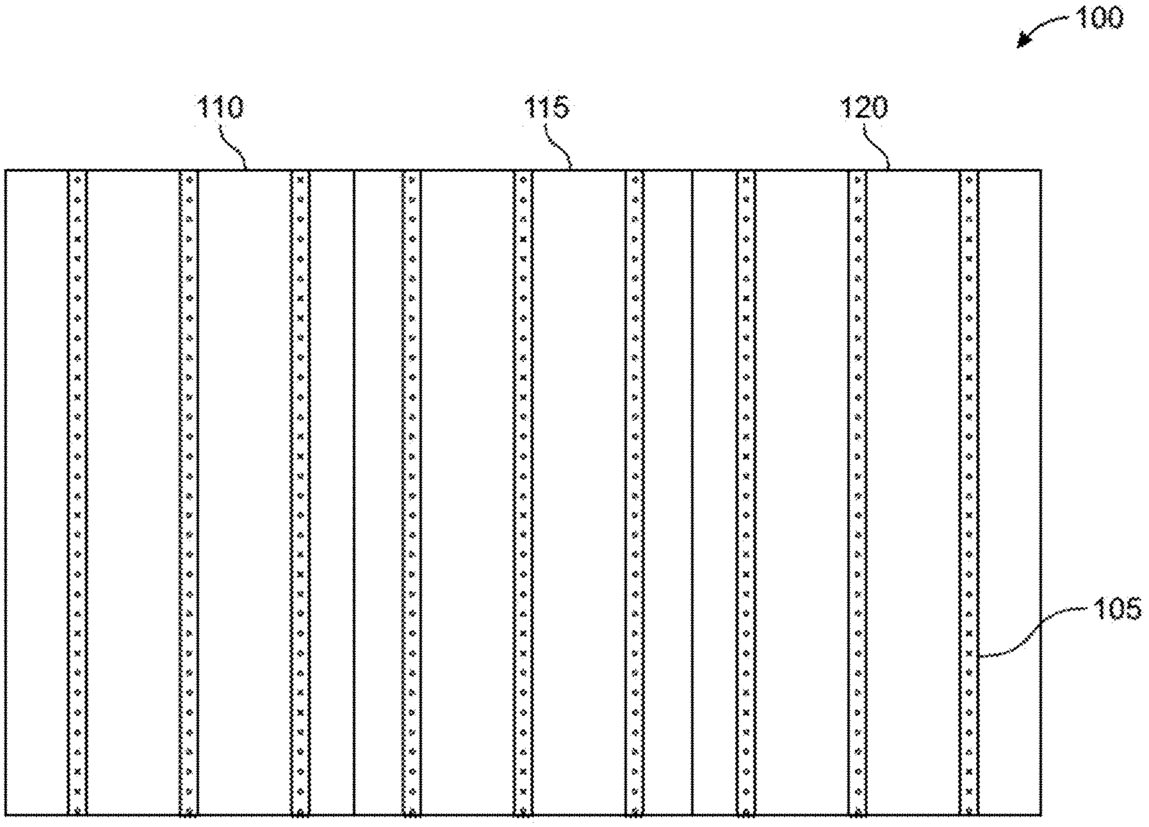
FIG. 1 illustrates an embodiment which includes an array of LED light bars.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

In accordance with one or more embodiments, one or more linear luminaires may be utilized which include one or more light sources and may generate a relatively uniform light ray output. In one or more embodiments, a linear luminaire may comprise an LED light bar and the one or more light sources may comprise one or more LEDs. For example, such LED light bars may be utilized within a horticulture implementation, such as to provide light to plants growing such as within a greenhouse or other indoor environment. Various embodiments are discussed herein which include one or more LED light bars. However, teachings discussed herein may also be applicable to embodiments utilizing other types of linear luminaires, for example.

In accordance with one or more embodiments, a detachable lens assembly which includes one or more lenses may be attached to one or more ends of a structure, such as a tub, in which LEDs of a light bar are disposed. The lens assembly may be detachable so that it may be selectively coupled to a particular portion of a transparent or translucent tube or housing of an LED light bar. Such a tube may comprise an elongated translucent or transparent housing and may have respective first and second ends. In one particular example, if LEDs of a light bar are disposed within a tube, such as one formed of glass or some other type of transparent material, such as plastic, lens assemblies may be coupled to or otherwise attached to the tube, such as at or near opposing ends of the tube. Each lens assembly may comprise a material such as plastic and may include one or more lenses to receive light emitting by one or more LEDs of the light bar. In one aspect, each of the lenses may refract or change a direction of propagation of rays of light emitted by one or more corresponding LEDs. By changing directions propagation of the rays of light, uniformity of light rays emitted by the LED light bar may be improved.

A detachable lens assembly may be affixed to one or both ends of a substantially linear luminaire, and may be capable of controlling the ray pattern of emitted light from the luminaire to facilitate the narrowing or collimating of such light. The lens assembly may be selectively positioned in accordance with an embodiment to selectively position one or more lenses disposed within the lens assembly to achieve a desired ray pattern. The lens assembly may facilitate the emission of a narrow ray pattern along a length direction of an LED lens bar or some other type of linear luminaire.

The lens assembly may be affixed at or near one or both of the respective end portions of an LED light bar and may not cover the entire length of the LED light bar. In some embodiments the detachable lens assembly comprises a mechanism for alignment of the lens assembly with light sources (such as LEDs) within the linear luminaire. A mechanism for alignment of the detachable lens assembly may be provided by mechanical connecting parts between the ends of the linear luminaires and the detachable lens assembly. For example, an end cap which may be present at one or both ends of the linear luminaire may include a mechanism for ensuring proper alignment of the detachable lens assembly to the linear luminaire.

In one or more embodiments, a lens assembly may comprise a flexible material, such as plastic, which may be clipped onto a portion of a light bar. Such a clip-on design may enable a human operator to relatively easily attach and/or detach the lens assembly to a linear luminaire such as a light bar or otherwise move the lens assembly without having to adhere the lens assembly to the linear luminaire, such as via use of glue or screws, for example.

In one or more embodiments, a mechanism is provided for reducing possible misalignments or poor alignment of the lens assembly. During operation, a detachable lens assembly may effectively become misaligned relative to LEDs or other light sources disposed within a linear luminaire such as an LED light bar. Such a misalignment may be a result of thermal expansion which may occur when LEDs become heated. In accordance with one or more embodiments, to mitigate the effects of thermal expansion, an LED circuit board on which LEDs are disposed may be split into two different LED circuit boards. For example, instead of using a single relatively long circuit board on which LEDs are disposed within a tube or housing of an LED light bar, two circuit boards may be utilized which do not physically overlap. By using two circuit boards, each circuit board may be physically coupled to opposing ends of the tube. Accordingly, one circuit board may be coupled to one end of a tube of a LED light bar, whereas a second circuit board may be coupled to the opposing end of the LED light bar. Such a design may minimize or otherwise reduce issues introduced by thermal expansion. Accordingly, instead of using a single relatively long circuit board which is not physically coupled to either end of tube of the LED light bar, two circuit boards may be used which are each physically coupled to opposing ends of a tube of the LED light bar. The use of such a split circuit board design may improve uniformity of light rays emitted by the LEDs of the light bar even in the event of thermal expansion of the split circuit board.

In accordance with an embodiment having LEDs disposed on two circuit boards within a tub of an LED light bar, a bracket may be used to fix each circuit board to an end of tube. Upon fixing each circuit board to opposing ends of the tube of the LED light bar, a sufficient gap or distance between the two circuit boards may remain so as to address potential issues introduced via thermal expansion of the circuit boards or other components during operation of the LED light bar.

An end cap may be fixed on the tube ends in one or more embodiments. Such an end cap may have a precise or fixed position relative to LEDs of an LED light bar. A lens assembly having one or more clips disposed thereon may be mated with the end caps in order to precisely locate the lens relative to the LEDs, e.g., to achieve an improved uniformity in light output.

FIG. 1 illustrates an embodiment 100 which includes an array of LED light bars 105. Embodiment 100 includes an array of nine LED light bars 105, each of which may have a length of 48 inches, for example. The LED light bars 105 of the array may be evenly displaced, such as positioned in parallel with about 6.7 inches of space between each LED light bar 105 in one particular example. In different embodiments, the LED light bars 105 may be evenly displaced by a distance greater or less than 6.7 inches. In some embodiments, the LED light bars 105 may be unevenly displaced, depending the particular desired aspects, for example. The array of LED light bars 105 may be utilized in a horticulture implementation. For example, the array of LED light bars 105 may be positioned with 18 inches of headspace, that is 18 inches of space between one or more plants and the LED light bars 105. In some embodiments, a different amount of headspace may be provided.

Each LED light bar 105 may be mounted on or otherwise disposed on a particular light bar shelf. Embodiment 100 includes three light bar shelves, e.g., first light bar shelf 110, second light bar shelf 115, and third light bar shelf 120. In one particular implementation, each light bar shelf may be 48 inches in length and 24 inches wide.

Figure 2:
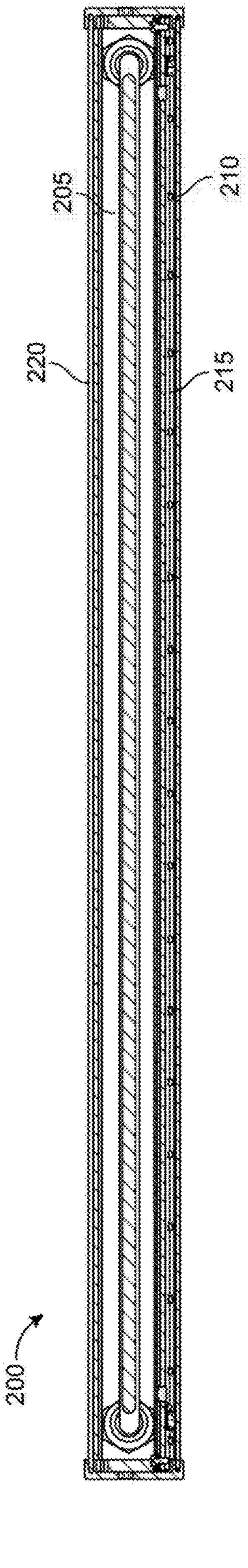
FIG. 2 illustrates an embodiment of an LED light bar.

FIG. 2 illustrates an embodiment 200 of an LED light bar 205. In embodiment 200, LED light bar 205 may include a plurality of LEDs 210. In embodiment 200, LED light bar 205 may include 20 approximately equally spaced LEDs 210 disposed on a circuit board 215 within a tube 220 or some other structure capable of supporting the circuit board 215 and LEDs 210. In some implementations, more or fewer than 20 LEDs 210 may be disposed on circuit board 215. In one or more embodiments, there may be a space such as 1 millimeter between LEDs 210, depending on the particular application and/or the illumination capability of each LED.

Figure 3A:
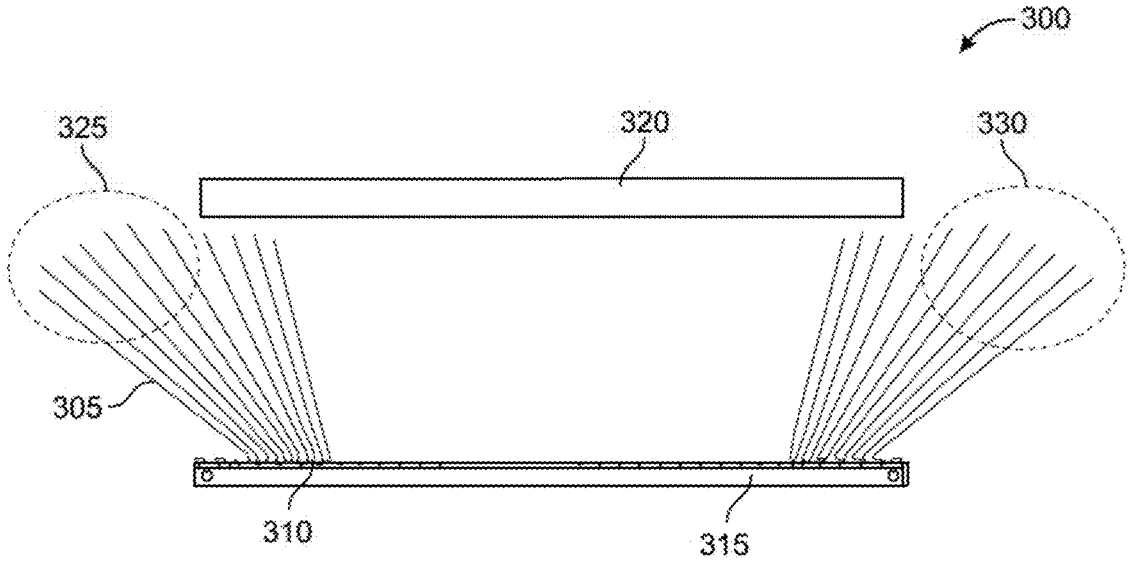
FIGS. 3A and 3B illustrate embodiments of a batten which has light sources, such as LEDs, disposed thereon and which emits light toward a grow field area of a horticultural implementation.
Figure 3B:
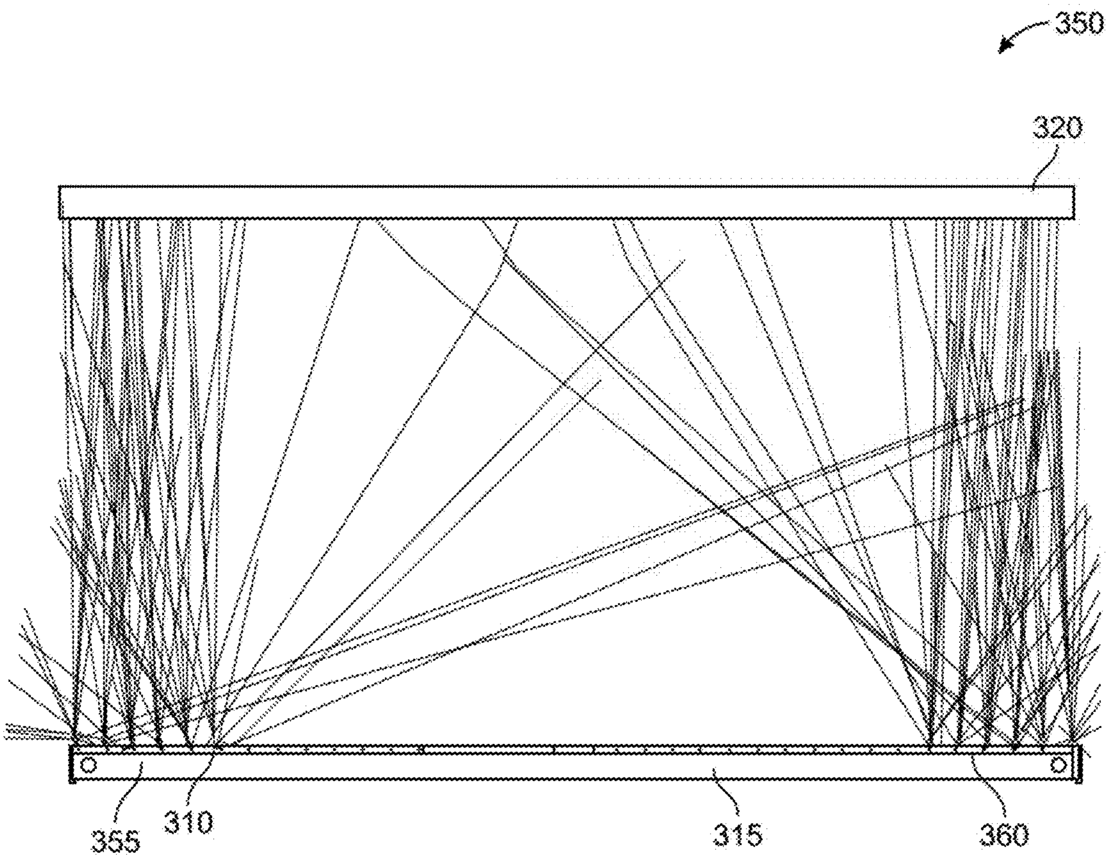

FIGS. 3A and 3B illustrate embodiments of a batten which has light sources, such as LEDs, disposed thereon and which emits light toward a grow field area of a horticultural implementation.

FIG. 3A illustrates an embodiment 300 showing a ray tracing plot of light rays 305 emitted from LEDs 310 disposed on opposing ends of an LED light bar 315. It should be appreciated that the additional LEDs 310 of the LED light bar 315 emit light rays other than the ones shown on opposing ends of LED light bar 315. However, light rays from such additional LEDs 310 of LED light bar 315 have been omitted from the illustration of FIG. 3A for the sake of simplicity. Light emitted from LEDs 310 may be provided to a grow field area 320. For example, one or more plants may be disposed in the grow field area 320, such as plants growing in an indoor environment which may not otherwise receive sufficient light to adequately grow. As illustrated, each of the LEDs 310 emits light rays which travel in various different directions. In an ideal scenario, for example, light from the LEDs 310 may be approximately evenly distributed across grow field area 320. However, in embodiment 300, light from LEDs disposed at or near the respective ends of LED light bar 315 may be emitted in a direction such that a portion of the light from such LEDs does not reach the grow field area 320. For example, light rays emitted from LEDs which pass through areas 325 and 330 are not incident with the grow field area 320. Light rays 305 from LEDs 315 which pass through areas 325 and 330 are therefore effectively wasted or are otherwise not useful in a implementation having various plant life in grow field area 320.

In order to improve the level of uniformity, a detachable lens assembly may be utilized to refract or redirect light rays from LEDs disposed at or near respective ends of LED light bar 315 in a direction toward grow field area 320. FIG. 3B illustrates an embodiment 350 showing a ray tracing plot of light rays 305 emitted from different LEDs 310 disposed on opposing ends of an LED light bar 315. It should be appreciated that additional LEDs 310 of the LED light bar 315 emit light rays, but light rays from the additional LEDs 310 of LED light bar have been omitted from the illustration of FIG. 3B for the sake of simplicity. Embodiment 350 of FIG. 3B differs from embodiment 300 of FIG. 3A by in the use of detachable lens assemblies 355 and 360 in embodiment 350.

Detachable lens assemblies 355 and 360 may include one or more lens to redirect light rays emitted from LEDs 310 disposed at or near respective ends of LED light bar 315 in a direction toward grow field area 320. By using such lens assemblies 355 and 360, a level of light uniformity for light emitted from each end of the LED light bar 315 may be improved.

A particular level of uniformity of light distribution from an LED array, such as is shown in embodiment 350 may be desired, such as to ensure that light is provided evenly across one or more plant disposed within grow field area 320 or for some other implementation. For a particular application, a minimum measurement of light uniformity or light ray uniformity may be desired or even required.

Light ray uniformity may be estimated by measuring a luminesce level or a photon flux within a particular test area. A measurement of photon flux refers to the number of photons per second per unit area. For example, if light rays from LED light bar 315 are to be utilized in an implementation with 18 inches of head space, a measurement of photon flux may be made at various locations 18 inches away from the LED light bar 315. In one example, light incident upon a box having length and width dimensions the same as those of LED light bar 315 located 18 inches from the LED light bar 315 may be measured. After photon flux values have been determined for various points or locations within a test area, measurements of both the minimum measured intensity value and the average photon flux value for all points within the test area may be determined. A calculation of light uniformity may be determined by dividing the measurement of the minimum measured photon flux value by the average luminescence or photon flux value of the test area. A perfectly uniform distribution would have a uniformity value of 100%. However, in an implementation which includes the LED light bar array of embodiment 100, a measurement of light ray uniformity may be about 69%. Such a measurement of 69% light ray uniformity may be unsuitable for an application which requires or desires measurements of uniformity of light ray distribution which are 80% or higher.

Figure 4:
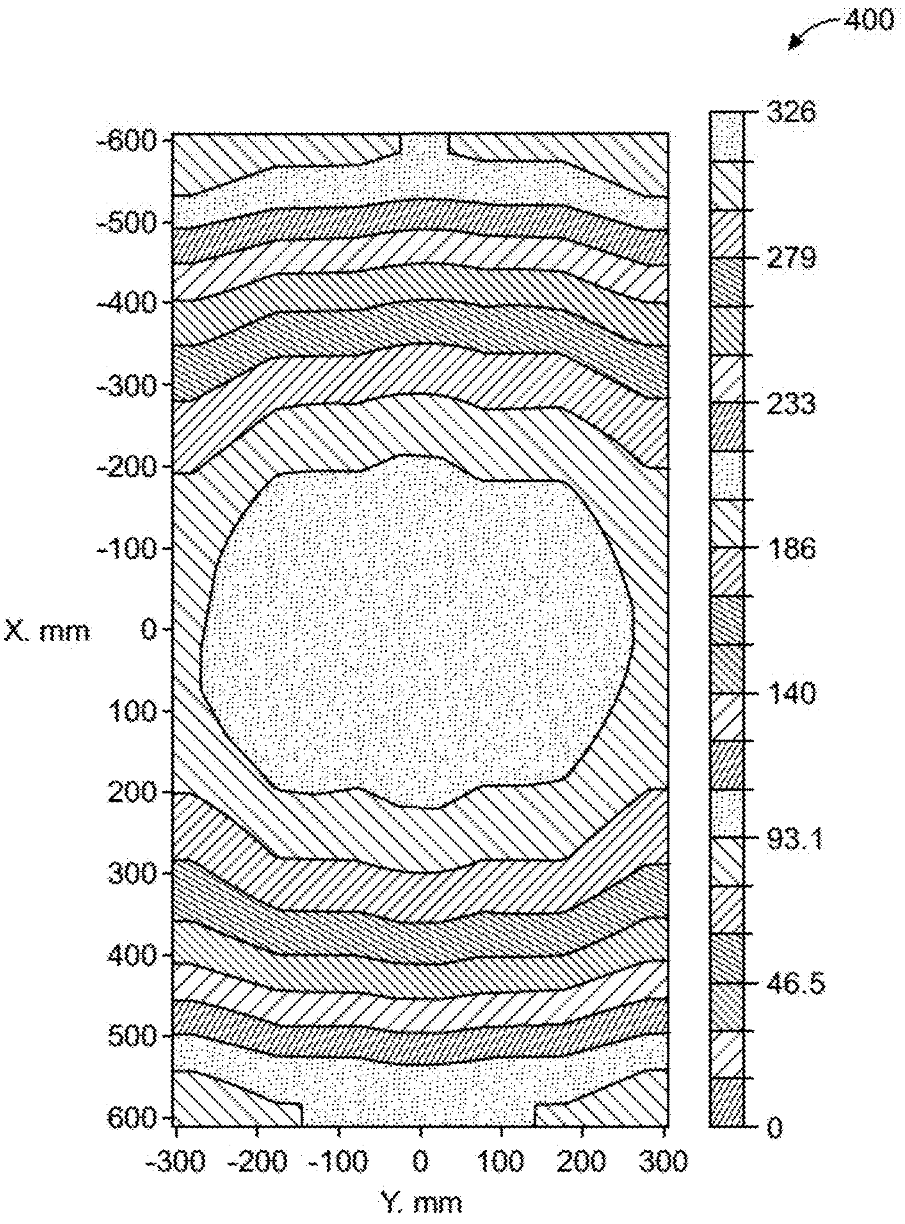
FIG. 4 illustrates an embodiment of a photon flux diagram showing a luminesce level measured for an array of LED light bars such as is shown in FIG. 1.

FIG. 4 illustrates an embodiment 400 of a Photosynthetic Photon Flux Density (PPFD) diagram showing a luminesce level measured for an array of LED light bars such as is shown in FIG. 1. PPFD, as used herein, refers to the total amount of light in a Photosynthetically Active Radiation (PAR) zone that is produced by a light source each second. For example, the PPFD diagram of embodiment 400 may be generated based on measured luminesce level values within a 24 inch×48 inch area, e.g., the size one of the bar shelves containing three LED light bars as shown in FIG. 1. As illustrated in FIG. 4, the average luminesce level value of all points of a test area was determined to be 274 micromoles per square meter per second ($\mu mol/m^2/s$), the minimum value was determined to be 188 $\mu mol/m^2/s$, and the maximum value was determined to be 326 $\mu mol/m^2/s$. In embodiment 400, the minimum luminesce level value divided by the maximum luminesce level value was determined to be 0.58. The minimum luminesce level value divided by the average photon flux value was determined to be 0.69. Accordingly, the light ray uniformity was therefore determined to be 69%, as discussed above.

Figure 5:
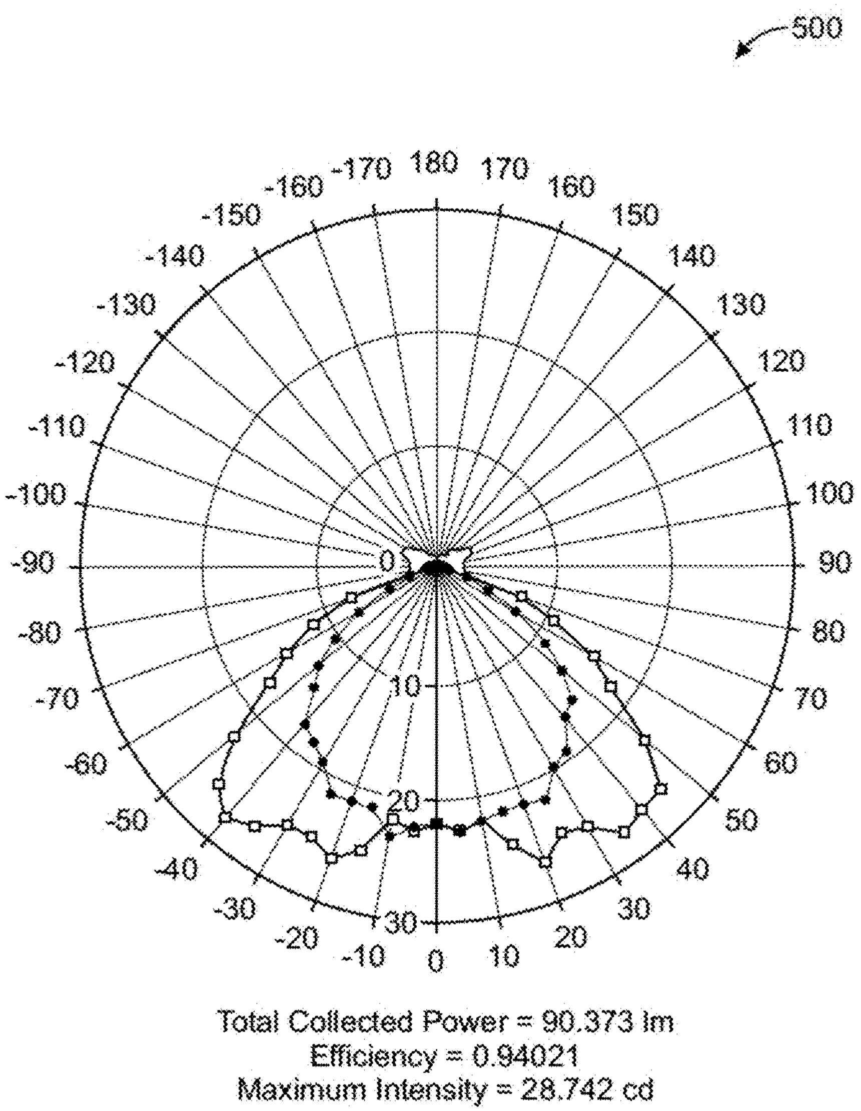
FIG. 5 illustrates an embodiment of a light intensity distribution for an array of LED light bars such as is shown in FIG. 1.

FIG. 5 illustrates an embodiment 500 of a light intensity distribution curve for an array of LED light bars such as is shown in FIG. 1. A light intensity distribution curve, as used herein, refers to a visual representation of light diffused by a luminaire. A light intensity distribution curve transposes a three-dimensional concept (e.g., the light diffusion of a lamp or fixture in a space) onto a two-dimensional medium (e.g., a sheet of paper or a computer screen). Embodiment 500 depicts the measured light intensity distribution curve of the array of LED light bars during operation of the array. As shown, the light intensity distribution exhibits a distorted batwing shape. Total collected power is 90.373 lumens (lm), the maximum intensity was measured to be 28.742 candelas (cd), and the efficiency was estimated to be 0.94021. Light efficiency for a particular luminaire, as used herein, refers to an intensity of light measured on a surface incident to the light divided by an intensity of the light exiting the luminaire.

In order to improve the uniformity of light ray distribution, one or more lenses may be utilized to distribute light rays more evenly from the LEDs at or near opposing ends of an LED light bar. The one or more lenses may also serve to increase a maximum intensity of a measured light intensity distribution, as discussed further with respect to FIG. 9.

Figure 6A:
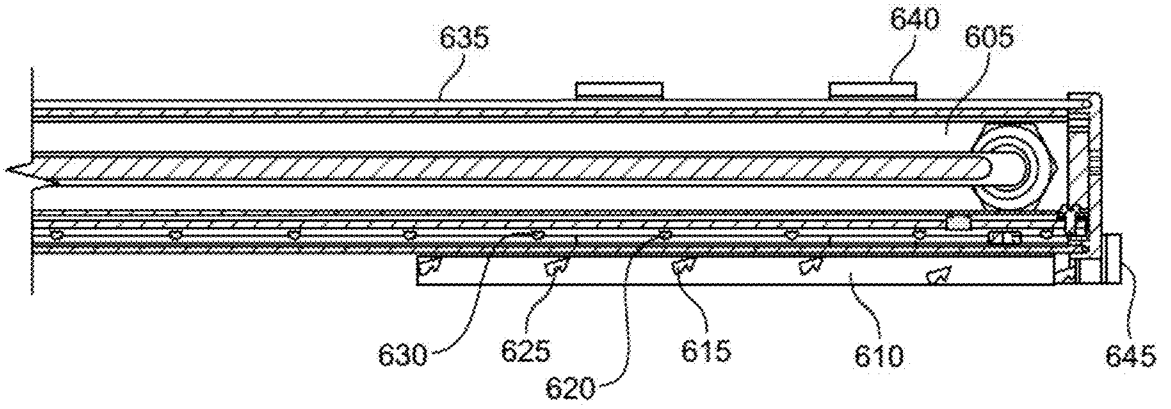
FIGS. 6A-B illustrate an embodiment of a portion of an LED light bar onto which a detachable lens assembly is attached.
Figure 6B:
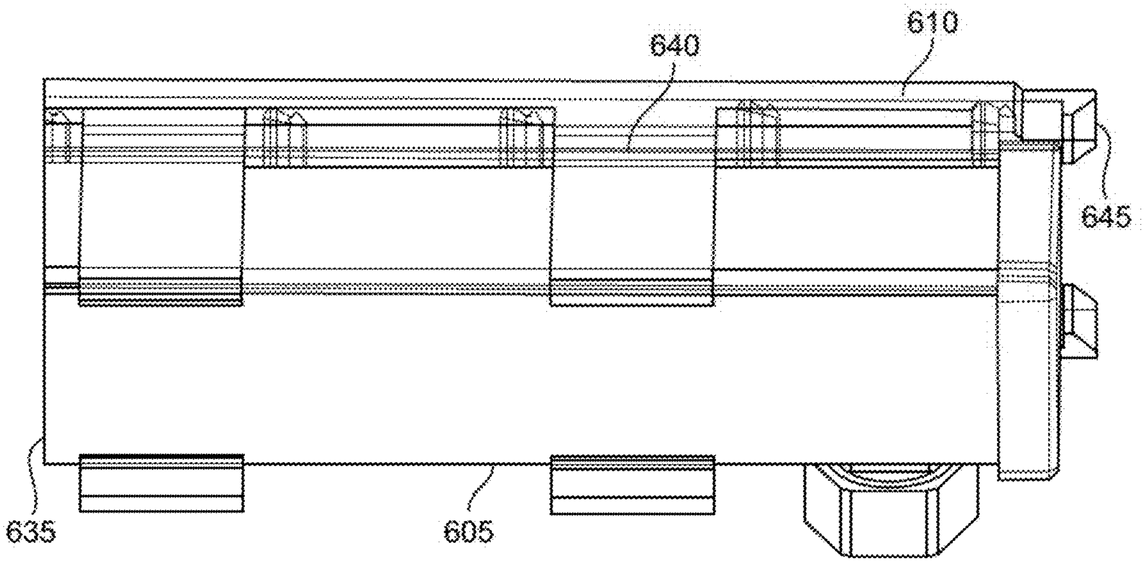

FIGS. 6A-B illustrate an embodiment of a portion of an LED light bar 605 onto which a detachable lens assembly 610 has been attached. FIG. 6A shows a cut-away view showing components within Led light bar 605, for example. In this embodiment, lens assembly 605 may be formed of a flexible plastic material and may include one or more lenses 615. The embodiment of FIG. 6A shows a lens assembly 610 which includes six lenses 615. Each of the lenses 615 is disposed in a location such that each of the lenses receives light rays emitted from one adjacent or nearby LED 620 of LED light bar 605. For example, a first lens 625 may receive light rays emitted from a first LED 630. A lens may serve to change a direction of light rays emitted from an LED 620 of LED light bar 610 in order to improve an light ray uniformity of light emitted by the LED light bar.

In the embodiment shown in FIG. 6A, lens assembly 610 may be attached to a structure, such as a tube 635 of LED light bar 605 via a clipping mechanism. For example, lens assembly 610 may include two vertical clips 640 and one or more horizontal clips 645 which grip at least a portion of an outer surface of the tube 635 to fix the lens assembly 610 in place. Although two vertical clips 640 and one horizontal clip 645 are shown in the embodiment, it should be appreciated that in some embodiments, a different number of clips may be utilized. Moreover, a mechanism other than one or more clips may be utilized to couple lens assembly 610 to tube 635 of LED light bar 605 in some implementations. For example, one or more screws, snaps, pins, or glue may be utilized to couple lens assembly 610 to tube 635 of LED light bar 605 in some implementations.

Although only a portion of one end of an LED light bar 605 is shown to which a lens assembly 610 is coupled in the embodiment shown in FIG. 6, it should be appreciated that a similar lens assembly 610 may be coupled to an opposing end of the LED light bar 605. Accordingly, two lens assembly may be coupled to a tube 635 or other structure of an LED light bar, as opposing ends, in some implementations. Moreover, in some implementations, a lens assembly may be coupled to a tube of an LED light bar at a portion which is located approximately in the middle of the LED light bar or at some other location other than the ends of the LED light bar.

FIG. 6B illustrates an external view of LED light bar 605 showing how the lens assembly 610 may be coupled to tube 635. As illustrated, two vertical clips 640, each having top and bottom portions, may be utilized to clip the lens assembly 605 in the vertical direction. Similarly, two horizontal clips 645 may be utilized to clip the lens assembly 605 in the horizontal direction.

As shown in FIGS. 6A-B, lens assembly 605 may serve to ensure that lenses contained within the lens assembly 605 align properly with LEDs of LED light bar 605. Such an arrangement may, for example, ensure a relatively high uniformity of light output.

Figure 7A:
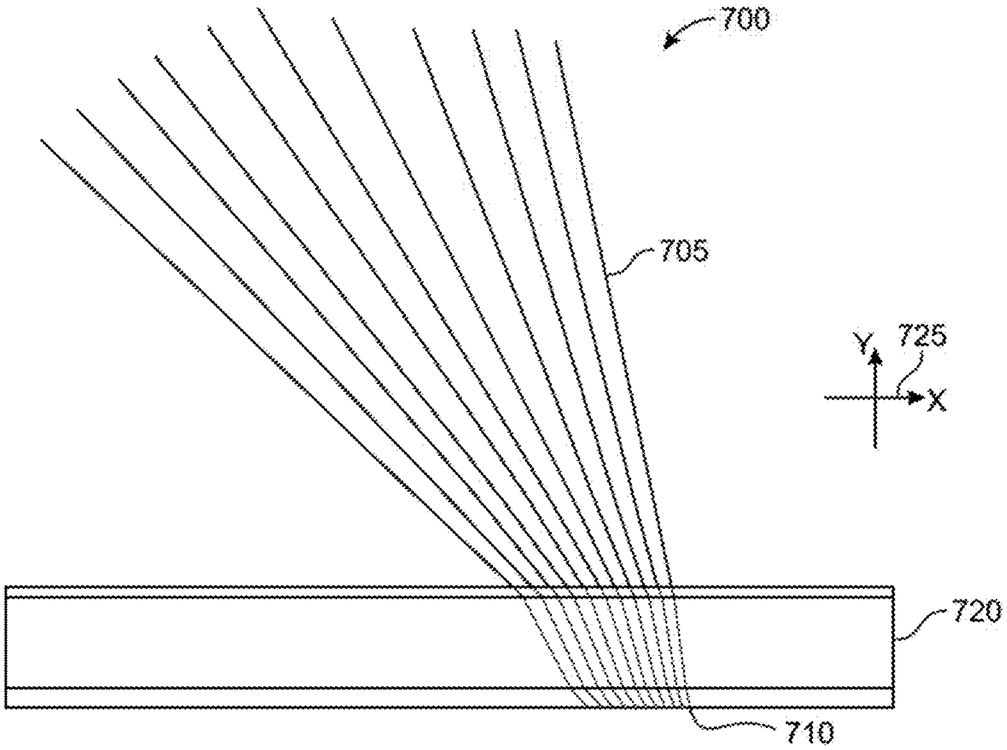
FIG. 7A illustrates an embodiment of various light rays emitted by one or more LEDs of an LED light bar.

FIG. 7A illustrates an embodiment 700 of various light rays 705 emitted by one or more LEDs 710 of an LED light bar 720. As shown, light rays 705 of embodiment 700 exit LED light bar 720 and propagate at a negative angle relative to a y-axis of a coordinate grid 725 extending in a direction perpendicular to a plane formed in a direction of an x-axis. If light rays 705 of embodiment 700 are to be provided to a light grow area of a horticulture implementation, it may be desirable to refract or redirect at least some of the light rays 705 toward such a light grow area.

Figure 7B:
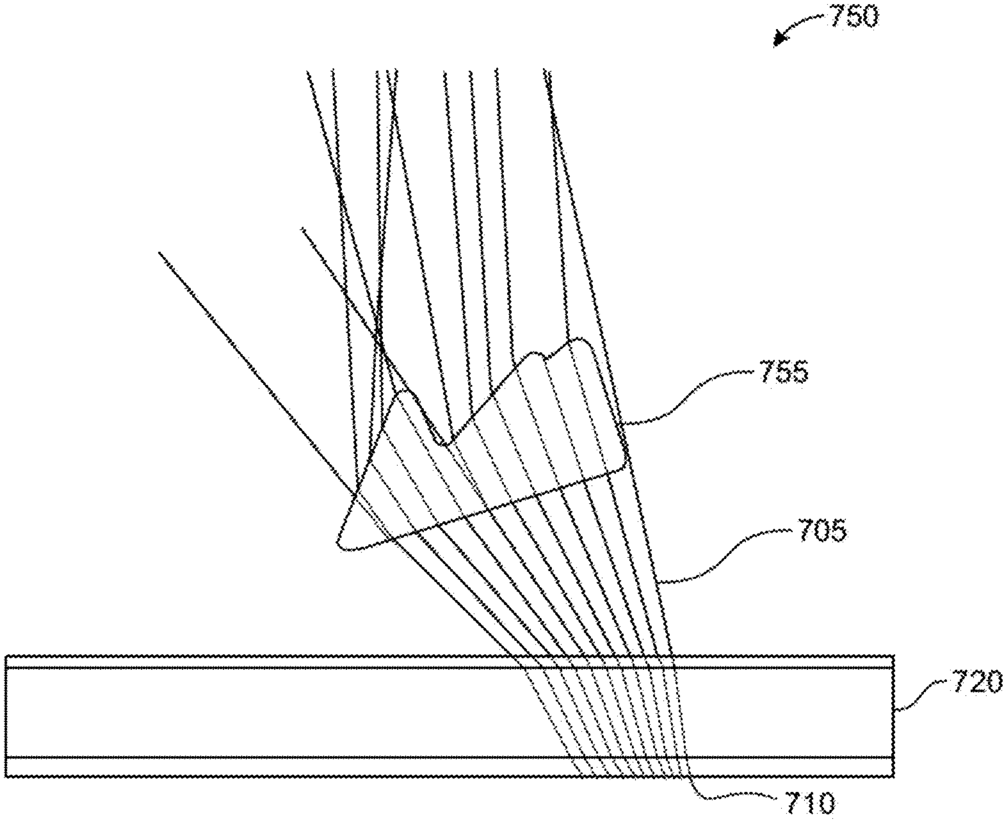
FIG. 7B illustrates an embodiment of a lens refracting or redirecting the paths of various light rays emitted by one or more LEDs of LED light bar.

FIG. 7B illustrates an embodiment 750 of a lens 755 refracting or redirecting the paths of various light rays emitted by one or more LEDs 710 of LED light bar 720. As shown embodiment 750 of FIG. 7B differs from embodiment 700 of FIG. 7A in that embodiment 750 includes lens 755. As shown, lens 755 has a particular shape which results in different light rays changing direction by differing amounts based on, for example, an angle of entry into the lens 755, a location point of entry into lens 755, and a location of exit from the lens 755. For example, such a lens 755 may be utilized to refract or alter the direction of propagation of one or more light rays 705 emitted from an LED 710 in order to, for example, improve uniformity of light ray distribution and/or increase a maximum intensity of a measured light intensity distribution.

Figure 8:
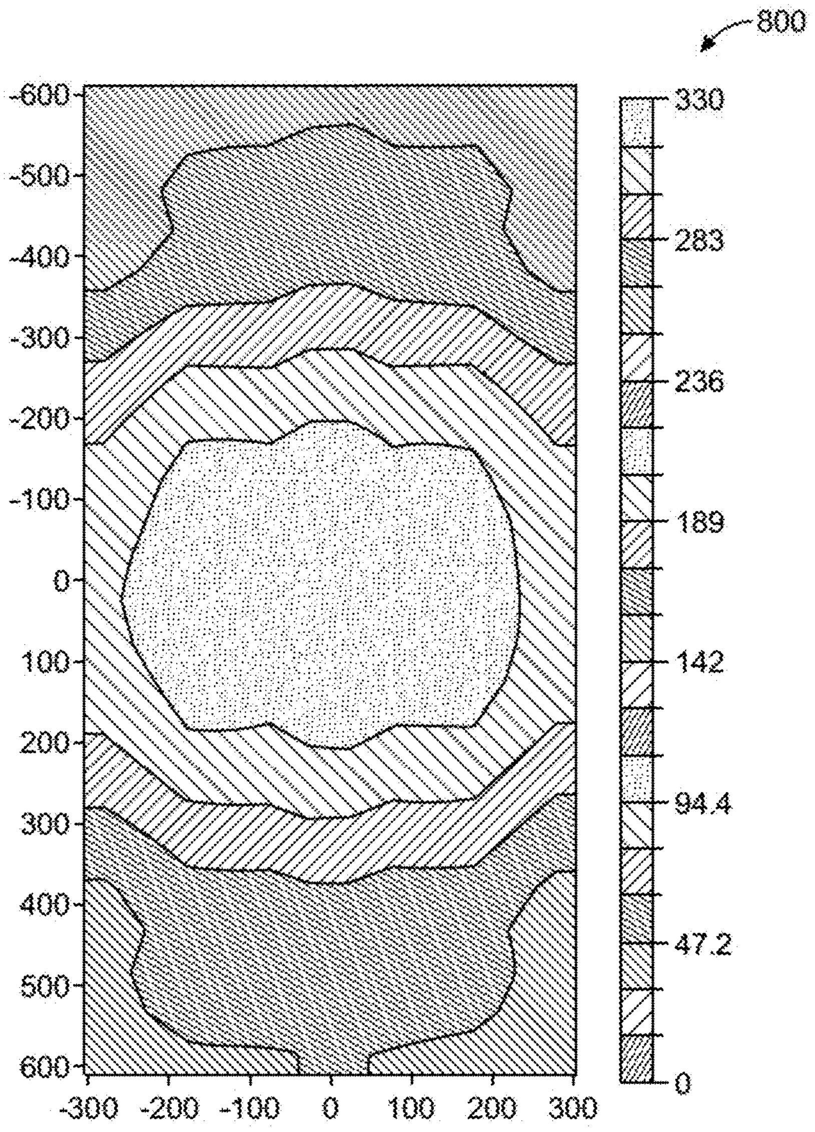
FIG. 8 illustrates an embodiment of a photon flux diagram measured for an LED light bar implementation utilizing lens assemblies disposed on respective ends of the LED light bar such as is shown in FIGS. 6A-B.

FIG. 8 illustrates an embodiment 800 of a photon flux diagram measured for an LED light bar implementation utilizing lens assemblies disposed on respective ends of the LED light bar such as is shown in FIGS. 6A-B. As illustrated in FIG. 8, the average luminesce level value of all points of a test area was determined to be 291.22 $\mu mol/m^2/s$, the minimum value was determined to be 253 $\mu mol/m^2/s$, and the maximum value was determined to be 330 $\mu mol/m^2/s$. In this embodiment 800, the minimum luminesce level value divided by the maximum luminesce level value was determined to be 0.76. The minimum luminesce level value divided by the average photon flux value was determined to be 0.87. Accordingly, the light ray uniformity was therefore determined to be 87%.

It should be appreciated that by using the lens assemblies at or near each end of an LED light bar, the light ray uniformity was improved from 69%, as shown in embodiment 400 of FIGS. 4, to 87%, as shown in embodiment 800 of FIG. 8. The minimum measured luminesce level was also increased from 188 to 253 by using the lens assemblies at or near each end of an LED light bar.

Figure 9:
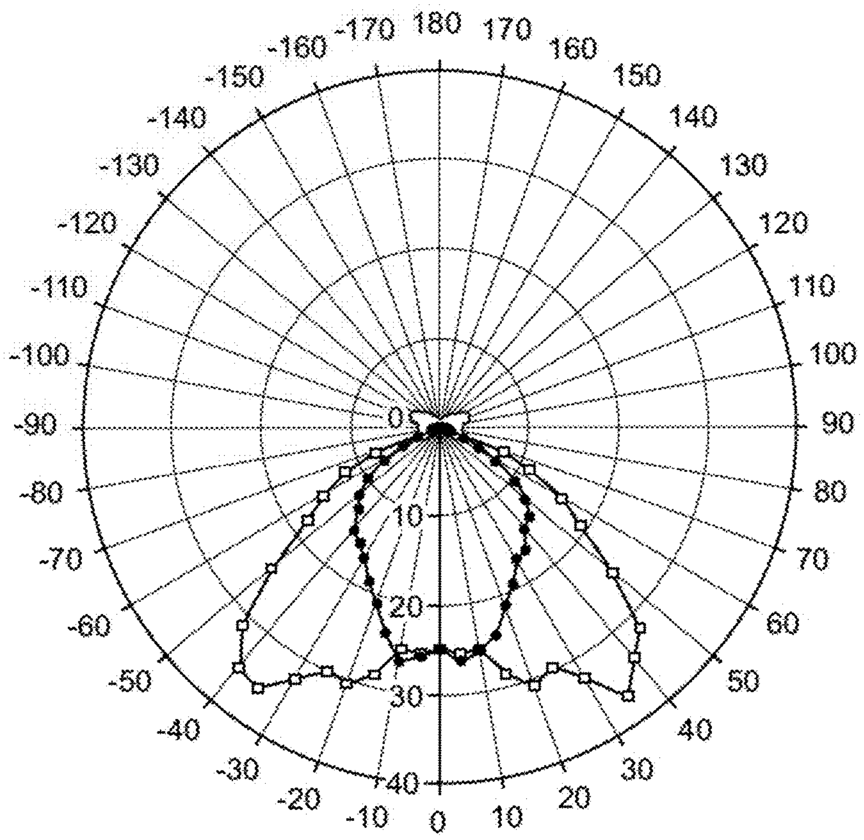
FIG. 9 illustrates an embodiment of a light intensity distribution for an array of LED light bars with lens containers disposed on each end thereof such as is shown in FIGS. 6A-B.

FIG. 9 illustrates an embodiment 900 of a light intensity distribution for an array of LED light bars with lens assemblies disposed on each end thereof such as is shown in FIGS. 6A-B. Embodiment 900 depicts the measured light intensity distribution of the array of LED light bars during operation of the array. As shown, the light intensity distribution exhibits a batwing shape. Total collected power is 89.801 lm, the maximum intensity was measured to be 36.709 cd, and the efficiency was estimated to be 0.93426. By using an array of LED light bars with lens assemblies disposed on each end thereof, the measurement of maximum intensity was increased from a measurement of 28.742 cd for an array of LED light bars without any lens assemblies as shown in embodiment 500 of FIG. 5, to a measurement of 36.709 cd as shown in embodiment 900 of FIG. 9.

One potential issue with LED light bars is thermal expansion of one or more components thereof during operation. For example, each LED may emit or otherwise output a certain amount of heat during operation and the emission of heat may cause a circuit board on which the LEDs are mounted to expand. However, if the circuit board expands, LEDs on which the circuit board are mounts may therefore be displaced relative to intended locations of the LEDs. Depending on the amount of displacement of each LED, the overall uniformity of light ray distribution of an array of one or more LED light bars may be adversely affected. In some implementations, a circuit board on which LEDs are mounted may not be affixed to any specified location or position within a tub or other assembly of the LED light bar. For example, in an implementation in which a single long circuit board of an LED light board is fixed, the circuit board may potentially crack or otherwise deform as a result of thermal expansion.

To reduce adverse effects of thermal expansion, an embodiment as discussed herein may utilize a split circuit board design. In other words, instead of using a single relatively long circuit board which extends approximately the entire length of an LED light bar and which is not affixed to a tube of the LED light bar at any particular location or position, two separate circuit boards may instead be utilized. For example, each circuit board may be approximately half the length of what a single relatively long circuit board would be. Moreover, instead of permitting the circuit board to essentially "float" within a tube of the lLED light bar by failing to affix the circuit board to a tube if the LED light bar at a particular location, each of the two circuit boards on which LEDs are mounted may be fixed to the tube of the LED light bar. For example, one of the circuit boards may be fixed at one end of the tube of the LED light bar and the other circuit board may be fixed at the other, opposing end, of the tube of the LED light bar. By using such a split circuit board implementation, for example, the displacement of one or more LEDs caused by thermal expansion of a circuit board onto which the one or more LEDs are mounted or otherwise coupled may therefore be reduced.

Figure 10A:
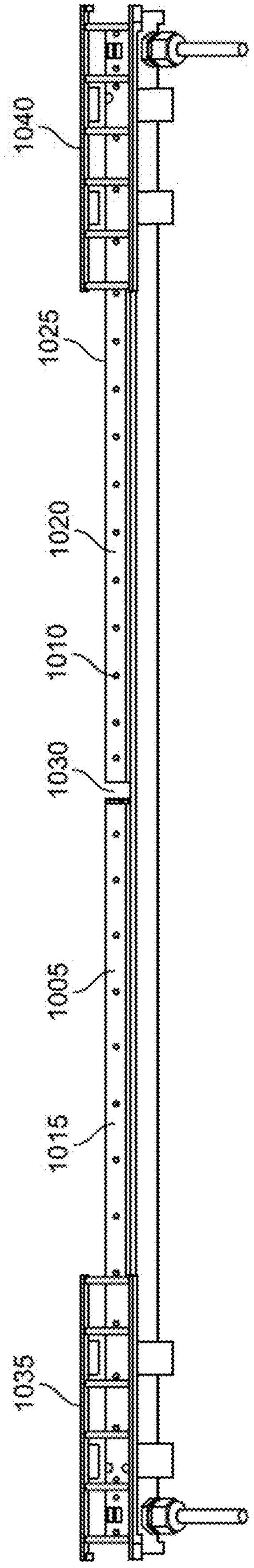
FIG. 10A-C illustrate an embodiment of an LED light bar which includes two separate circuit boards on which LEDs are disposed.
Figure 10B:
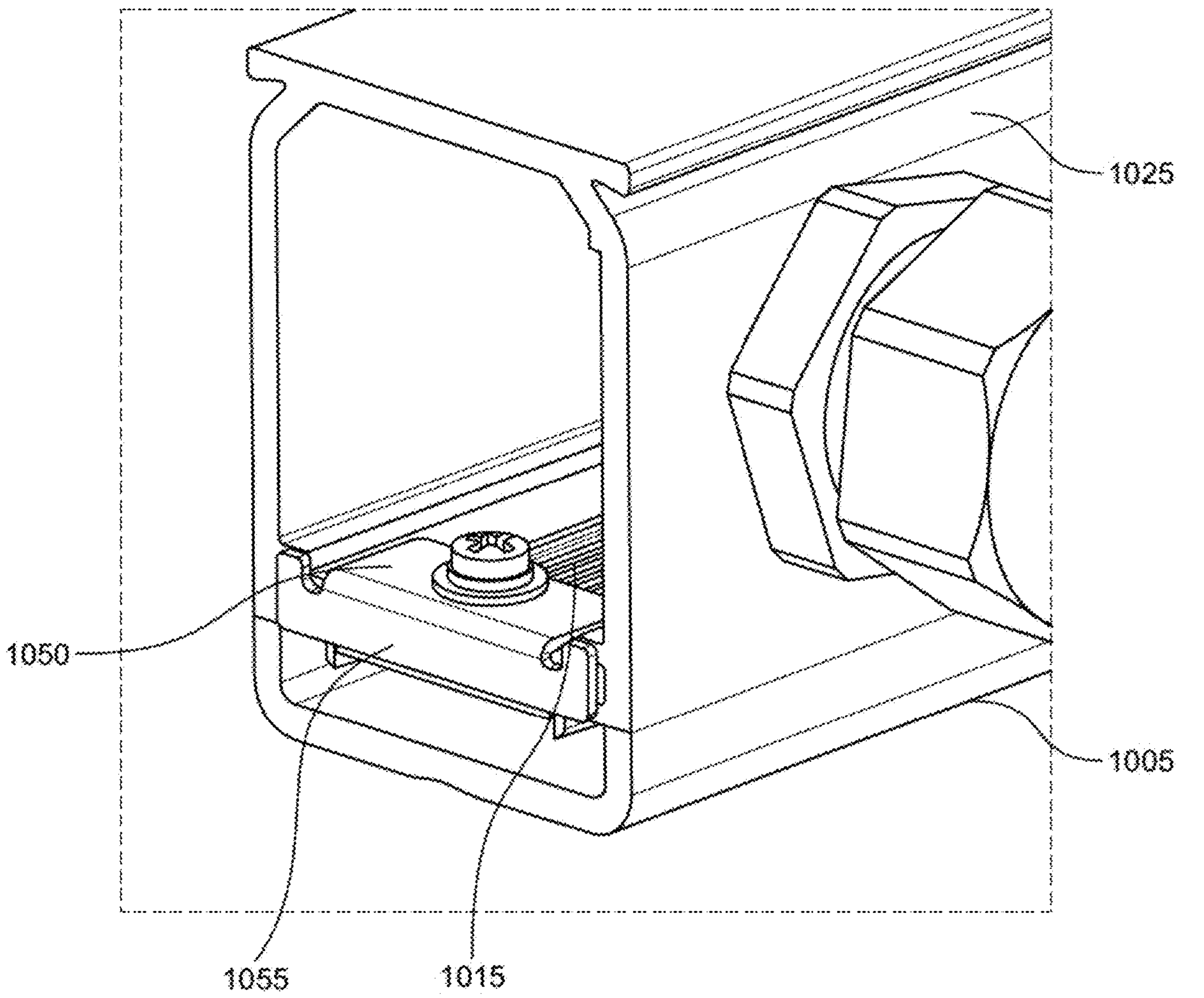
Figure 10C:
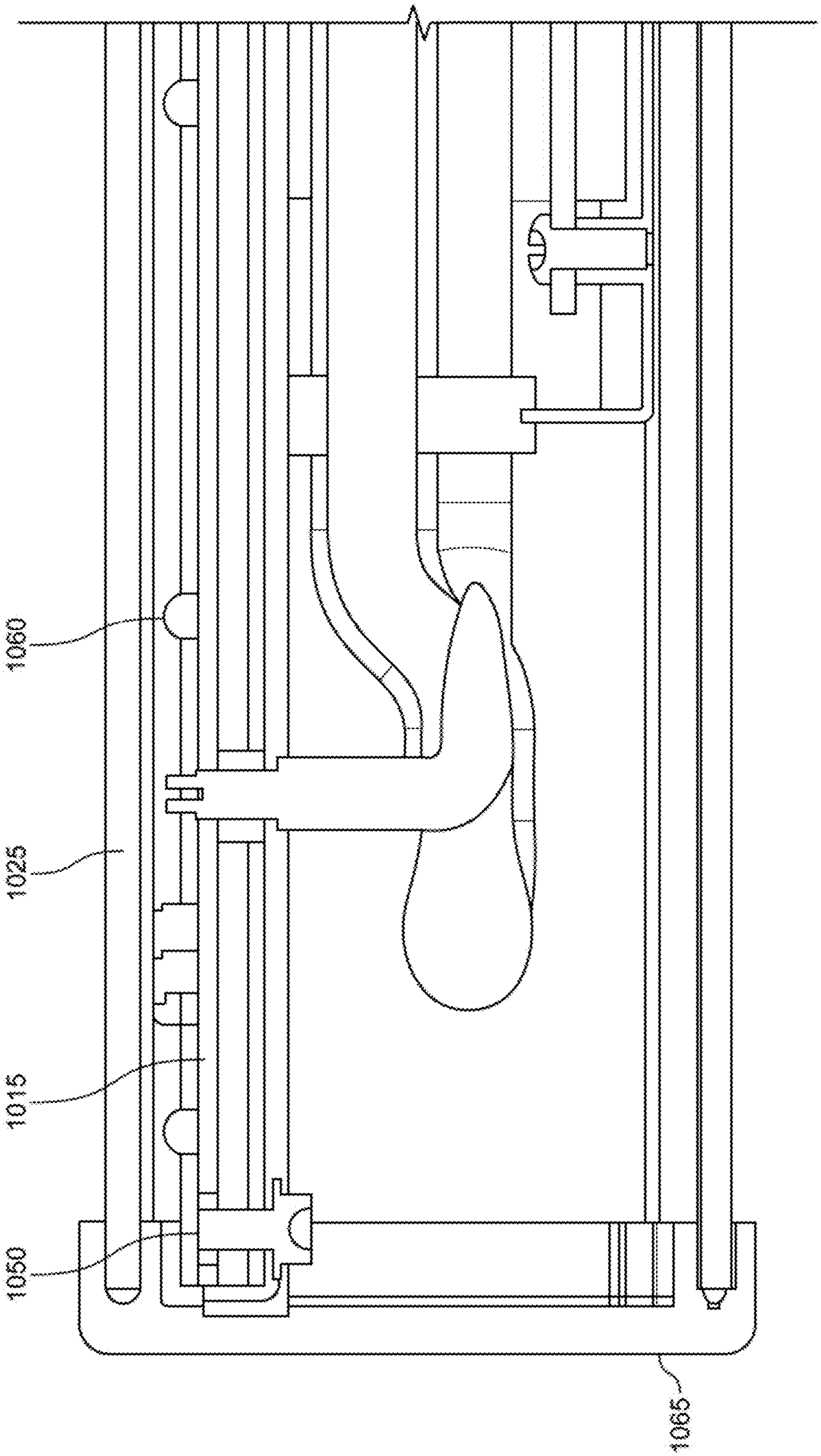

FIG. 10A-C illustrate an embodiment of an LED light bar 1005 which includes two separate circuit boards on which LEDs 1010 are disposed. As illustrated in FIG. 10A, for example, LED light bar 1005 may include a first circuit board 1015 and a second circuit board 1020. First circuit board 1015 and second circuit board 1020 may have approximately the same dimensions and may each be disposed within a transparent or translucent tube 1025 or some other type of outer casing or support structure of the LED light bar 1005. There may be a gap 1030 disposed between the first circuit board 1015 and the second circuit board 1020 to allow each of the first circuit board 1015 and the second circuit board 1020 to expand under certain conditions, such as via thermal expansion during operation of the LED light bar 1005. In some implementations, first circuit board 1015 and second circuit board 1020 may each be fixed to opposing ends of the LED light bar 1005. For example, a portion of first circuit board 1015 may be fixed, such as via one or more screws or via glue, to or near an end of the LED light bar 1005 so that if first circuit board 1015 expands, the first circuit board 1015 may expand in a direction of gap 1030. Similarly, a portion of second circuit board 1020 may be fixed to or near an end of the LED light bar 1005 so that if second circuit board 1020 expands, the second circuit board 1020 may also expand in a direction of gap 1030.

As illustrated in FIG. 10A, the embodiment includes a first lens assembly 1035 which may be disposed at one end of the LED light bar 1005. The embodiment 1000 may additionally include a second lens assembly 1040 disposed at another end of the LED light bar 1005 opposite to where the first lens structure 1035 is disposed, for example.

FIG. 10B illustrates an end portion of LED light bar 1005. FIG. 10B shows a portion of first circuit board 1015 which is coupled to a tube 1025 or housing structure of LED light bar 1005. For example, first circuit board 1015 may include a bracket 1050 which may be fixed to an end support 1055 of tube 1025. For example, a screw 1060 may be utilized to fix bracket 1050 to end support 1055. Although a single screw 1060 is illustrated in FIG. 10B, it should be appreciated that in different embodiments, more than two screws may be utilized. It should also be appreciated that one or more items other than a screw may be utilized to fix the bracket 1050 to the end support 1055, such as a glue material, for example.

FIG. 10C illustrates an end portion of LED light bar 1005 which includes an end cap 1065 disposed on an end thereof. FIG. 10C shows a portion of first circuit board 1015 having LEDs 1060 and which is coupled to a tube 1025 or housing structure of LED light bar 1005. FIG. 10C also shows that end cap 1065 is attached to the end of the tube 1025. It should be appreciated that the relatively position between the end cap 1065 and the first circuit board 1015 is precise, for example. For example, each of the first lens assembly 1035 and the second lens assembly 1040 may be mechanically attached to a respective end cap 1065. End cap 1065 may, for example, serve to keep dirt or liquid from touching and potentially damaging the first circuit board 1015.

Figure 11:
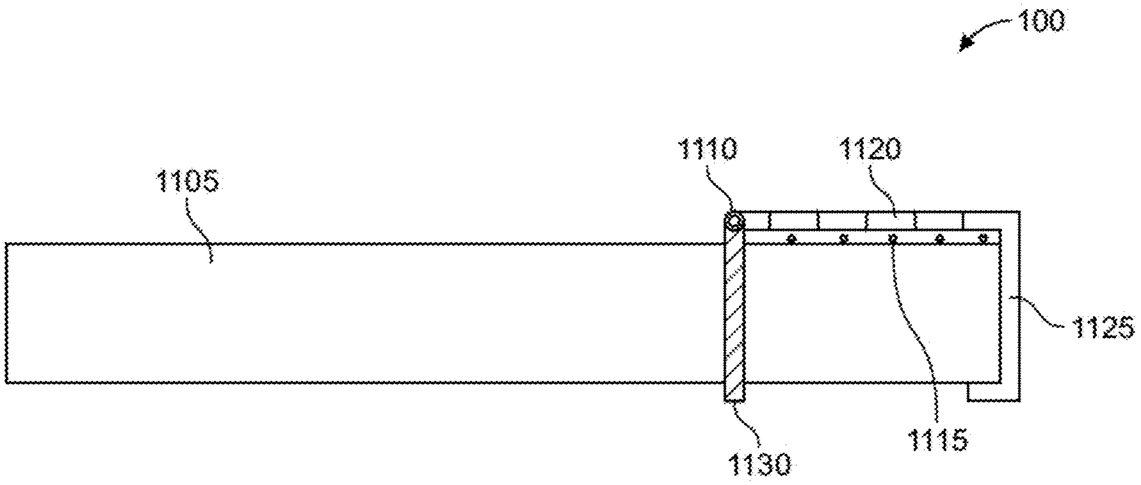
FIG. 11 illustrates an embodiment of an LED light bar which includes a lens assembly having an adjustable support structure.

FIG. 11 illustrates an embodiment 1100 of an LED light bar 1105 which includes a lens assembly 1110 having an adjustable support structure. As illustrated, LED light bar 1105 may include various LEDs 1115 for providing light ray such as for a horticulture implementation. Lens assembly 1110 may include one or more lenses 1120 to refract or redirect light rays from LEDs 1115. Lens assembly 1110 may be affixed at or near an end of LED light bar 1105. For example, one end of lens assembly 1110 may be coupled via a fixed structural portion 1125 to an approximate end of LED light bar 1105. An opposing end of lens assembly 1110 may be coupled to LED light bar 1105 via an adjustable structural portion 1130. For example, adjustable structural portion 1130 may comprise a clip, wall, or other support mechanism which may be capable of sliding in a direction toward or away from fixed structural support 1125 while gripping or otherwise remaining in contact with a housing or tube of LED light bar 1105. Adjustable structural support 1130 may be selectively positioned to avoid or otherwise minimize an amount of light emitting from one or more LEDs 1115 which is blocked by the body of the adjustable structural support 1130.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A luminaire assembly comprising:

an elongated translucent or transparent housing, the housing comprising a first end and a second end and a housing body extending along an axis of the housing between the first end and the second end;

one or more light sources at least partially enclosed by the elongated housing; and a detachable lens assembly affixed to an external surface of the housing at or near the first end, the detachable lens assembly including one or more lenses to improve a uniformity of light ray distribution of light rays emitted by the one or more light sources, the detachable lens assembly having an assembly body extending between a first lens assembly end and a second lens assembly end, a length of the assembly body being less than a length of the housing body.

2. The luminaire assembly of claim 1, wherein the one or more light sources comprise one or more light emitting diodes (LEDs).

3. The luminaire assembly of claim 1, wherein luminaire assembly comprises a light emitting diode (LED) bar.

4. The luminaire assembly of claim 1, wherein the detachable lens assembly includes one or more clips to affix the detachable lens assembly to the housing.

5. The luminaire assembly of claim 4, wherein the detachable lens assembly includes one or more clips to affix the detachable lens assembly in at least one of a horizontal direction and a vertical direction relative to a length of the housing.

6. The luminaire assembly of claim 1, further comprising an end cap disposed on each of the first end and the second end of the housing, wherein the detachable lens assembly is mechanically attached, at least in part, to at least one of the end caps.

7. The luminaire assembly of claim 1, further comprising at least two circuit boards on which the plurality of the light sources are disposed.

8. The luminaire assembly of claim 7, wherein the at least two circuit boards comprise a first circuit board and a second circuit board, the first circuit board being affixed to the first end of the housing and the second circuit board being affixed to the second end.

9. The luminaire assembly of claim 8, a gap being disposed between the first circuit board and the second circuit board within the housing.

10. A luminaire assembly comprising:

an elongated translucent or transparent housing, the housing comprising a first end and a second end;

a first circuit board and a second circuit board disposed within the housing, the first circuit board being affixed at or near the first end of the housing and the second circuit board being affixed to the second end, wherein the first circuit board is unconnected to the second circuit board and a gap is disposed between one end of the first circuit board and an opposing end of the second circuit board, the gap to enable thermal expansion of at least one of the first circuit board or the second circuit board while maintaining separation between the one end of the first circuit board and the opposing end of the second circuit board; and one or more first light sources disposed on the first circuit board.

11. The luminaire assembly of claim 10, further comprising a detachable lens assembly affixed to at least one of the first end and the second end, the detachable lens assembly including one or more lenses improve a uniformity of light ray distribution of light rays emitted by at least one of the one or more first light sources.

12. The luminaire assembly of claim 11, wherein the detachable lens assembly includes one or more clips to affix the detachable lens assembly to the housing.

13. The luminaire assembly of claim 11, wherein the detachable lens assembly includes one or more clips to affix the detachable lens assembly in at least one of a horizontal direction and a vertical direction relative to a length of the housing.

14. The luminaire assembly of claim 11, further comprising an end cap disposed on each of the first end and the second end of the housing, wherein the detachable lens assembly is mechanically attached, at least in part, to at least one of the end caps.

15. The luminaire assembly of claim 10, wherein at least one of the one or more first light sources comprises one or more light emitting diodes (LEDs).

16. The luminaire assembly of claim 10, wherein the luminaire assembly comprises a light emitting diode (LED) bar.

17. The luminaire assembly of claim 10, a gap being disposed between the first circuit board and the second circuit board within the housing.

18. A luminaire assembly comprising:

an elongated translucent or transparent housing, the housing comprising a first end and a second end and a housing body extending along an axis of the housing between the first end and the second end;

one or more light sources at least partially enclosed by the elongated housing; and a detachable lens assembly comprising a flexible material, the detachable lens assembly being affixed to an external surface of the housing at or near the first end, the detachable lens assembly including one or more lenses to improve a uniformity of light ray distribution of light rays emitted by the one or more light sources.

19. The luminaire assembly of claim 18, wherein the detachable lens assembly is capable of being selectively clipped onto a portion of the housing body.

20. The luminaire assembly of claim 18, wherein the flexible material comprises a plastic material.

* * * * *